United States Patent
McPeek-Bechtold et al.

(10) Patent No.: US 12,115,989 B1
(45) Date of Patent: Oct. 15, 2024

(54) RESPONDING TO INPUT ON A BRAKE PEDAL OF A BRAKE BY WIRE SYSTEM FOR AN AUTONOMOUS VEHICLE

(71) Applicant: Waymo LLC, Mountain View, CA (US)

(72) Inventors: Nolan McPeek-Bechtold, Belmont, CA (US); Kimberly Toth, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/110,650

(22) Filed: Feb. 16, 2023

Related U.S. Application Data (63) Continuation of application No. 16/877,531, filed on May 19, 2020, now Pat. No. 11,608,066.

(51) Int. Cl.
*B60W 30/18* (2012.01)
*B60W 10/18* (2012.01)
*B60W 60/00* (2020.01)

(52) U.S. Cl.
CPC ...... *B60W 30/18109* (2013.01); *B60W 10/18* (2013.01); *B60W 60/0018* (2020.02); *B60W 2554/4041* (2020.02); *B60W 2554/60* (2020.02); *B60W 2710/18* (2013.01)

(58) Field of Classification Search
CPC .......... B60W 10/18; B60W 30/18109; B60W 60/0018; B60W 2554/4041; B60W 2710/18
See application file for complete search history.

(56) References Cited

U.S. PATENT DOCUMENTS

| | | | |
|---|---|---|---|
| 6,751,535 B2 | 6/2004 | Mori | |
| 7,894,951 B2 | 2/2011 | Norris et al. | |
| 8,060,306 B2 | 11/2011 | Puhalla et al. | |
| 2015/0088358 A1 | 3/2015 | Yopp | |
| 2016/0280236 A1 | 9/2016 | Otsuka | |
| 2016/0339915 A1 | 11/2016 | Kuwahara et al. | |
| 2016/0375900 A1 | 12/2016 | Laur et al. | |
| 2017/0166221 A1* | 6/2017 | Osterman | A63G 31/00 |
| 2019/0009794 A1* | 1/2019 | Toyoda | B60W 50/12 |
| 2019/0155294 A1 | 5/2019 | Inoue et al. | |
| 2019/0291747 A1* | 9/2019 | Chiba | G08G 1/00 |
| 2020/0047766 A1 | 2/2020 | Ko et al. | |

(Continued)

OTHER PUBLICATIONS

John Beck, et al., Team Oshkosh DARPA Urban Challenge, Apr. 13, 2007, pp. 1-25.

(Continued)

*Primary Examiner* — Anshul Sood
(74) *Attorney, Agent, or Firm* — Botus Churchill IP LAW LLP (57) ABSTRACT

Aspects of the disclosure relate to controlling a vehicle in an autonomous driving mode where vehicle has a drive by wire braking system. For instance, while the vehicle is being controlled in the autonomous driving mode, a signal corresponding to input at a brake pedal of the drive by wire braking system may be received. An amount of braking may be determined based on the received signal. The amount of braking may be used to determine a trajectory for the vehicle to follow. The vehicle may be controlled in the autonomous driving mode using the trajectory.

20 Claims, 10 Drawing Sheets

(56) References Cited

U.S. PATENT DOCUMENTS

2021/0001894 A1 1/2021 Mahnkopf
2021/0402968 A1* 12/2021 Haag ..................... B60T 13/741

OTHER PUBLICATIONS

Jordan Kalinowski, et al., Drive-By-Wire for an Autonomous Formula SAE Car, Preprints of the 19th World Congress, The Int'l Federation of Automatic Control, Aug. 24-29, 2014, pp. 1-6, Cape Town, South Africa.

* cited by examiner

RESPONDING TO INPUT ON A BRAKE PEDAL OF A BRAKE BY WIRE SYSTEM FOR AN AUTONOMOUS VEHICLE

CROSS REFERENCE TO RELATED APPLICATIONS

The present application is a continuation of U.S. patent application Ser. No. 16/877,531, filed May 19, 2020, the entire disclosure of which is incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location by controlling various systems of the vehicles, including acceleration and deceleration (braking) systems of the vehicle.

Traditional braking systems enable a driver to directly (e.g. physically) build up brake pressure by applying a sufficient amount of force on a brake pedal, even when a vehicle is operating in an autonomous driving mode. Brake by wire systems may include a brake pedal which does not directly build brake pressure but rather sends a signal to an actuator to build brake pressure and activate the vehicle's brakes. As such, for the aforementioned autonomous vehicles, inputs to the brake pedal can be completely isolated while the vehicle is operating in a fully autonomous driving mode or can be used as a signal to disengage the autonomous driving mode.

BRIEF SUMMARY

One aspect of the disclosure provides a method of controlling a vehicle in an autonomous driving mode, the vehicle having a drive by wire braking system. The method includes, while the vehicle is being controlled in the autonomous driving mode, receiving, by one or more processors, a signal corresponding to input at a brake pedal of the drive by wire braking system: determining, by the one or more processors, an amount of braking based on the received signal: using, by the one or more processors, the amount of braking to determine a trajectory for the vehicle to follow; and controlling, by the one or more processors, the vehicle in the autonomous driving mode using the trajectory.

In one example, the method also includes, prior to determining the amount of braking, determining that the input meets a threshold force. In another example, the method also includes, not disengaging the autonomous driving mode in response to receiving the input. In another example, using the amount of braking to determine the trajectory includes using the amount of braking as a hard constraint for solving for the trajectory such that the trajectory includes at least the amount of braking. In another example, using the amount of braking to determine the trajectory includes using the amount of braking as a soft constraint based on driving circumstances for the vehicle. In this example, the driving circumstances include that there is a tailgating vehicle behind the vehicle. In addition or alternatively, the driving circumstances include that the vehicle is within an intersection when the input is received. In addition or alternatively, the driving circumstances include that the vehicle is crossing railroad tracks when the input is received.

Another aspect of the disclosure provides a system for controlling a vehicle in an autonomous driving mode, the vehicle having a drive by wire braking system. The system includes one or more processors configured to: while the vehicle is being controlled in the autonomous driving mode, receive a signal corresponding to input at a brake pedal of the drive by wire braking system: determine an amount of braking based on the received signal: use the amount of braking to determine a trajectory for the vehicle to follow; and control the vehicle in the autonomous driving mode using the trajectory.

In one example, the one or more processors are further configured to, prior to determining the amount of braking, determine that the input meets a threshold force. In another example, the one or more processors are further configured to not disengage the autonomous driving mode in response to receiving the input. In another example, the one or more processors are configured to use the amount of braking to determine the trajectory by using the amount of braking as a hard constraint for solving for the trajectory such that the trajectory includes at least the amount of braking. In another example, the one or more processors are configured to use the amount of braking to determine the trajectory by using the amount of braking as a soft constraint based on driving circumstances for the vehicle. In this example, the driving circumstances include that there is a tailgating vehicle behind the vehicle. In addition or alternatively, the driving circumstances include that the vehicle is within an intersection when the input is received. In addition or alternatively, the driving circumstances include that the vehicle is crossing railroad tracks when the input is received. In another example, the system also includes the vehicle.

Another aspect of the disclosure provides a non-transitory computer readable medium on which instructions are stored. The instructions, when executed by one or more processors, cause the one or more processors to perform a method for controlling a vehicle in an autonomous driving mode. The vehicle has a drive by wire braking system. The method includes, while the vehicle is being controlled in the autonomous driving mode, receiving a signal corresponding to input at a brake pedal of the drive by wire braking system: determining an amount of braking based on the received signal: using the amount of braking to determine a trajectory for the vehicle to follow; and controlling the vehicle in the autonomous driving mode using the trajectory.

In one example, the method further comprises, prior to determining the amount of braking, determining that the input meets a threshold force. In another example, the method further comprises determining to not disengage the autonomous driving mode in response to receiving the input.

DETAILED DESCRIPTION

Overview

The technology relates to managing driver input in brake by wire systems in vehicles when operating in an autonomous driving mode. Traditional braking systems enable a driver to directly (e.g. physically) build up brake pressure by applying a sufficient amount of force on a brake pedal, even when a vehicle is operating in an autonomous driving mode. Brake by wire systems may include a brake pedal which does not directly build brake pressure but rather sends a signal to an actuator to build brake pressure and activate the vehicle's brakes. As such, inputs to the brake pedal can be completely isolated while the vehicle is operating in a fully autonomous driving mode. However, since the brake pedal is physically still in the vehicle, there might be a desire for an occupant (e.g. a driver or passenger) to use a brake pedal and thus to also have the vehicle respond to that input.

An autonomous vehicle's computing devices can determine the force the human is applying on the brake pedal and take a number of responsive actions. For instance, the vehicle's computing devices may respond by disengaging the autonomous driving mode and switching to a manual driving mode. Alternatively, the computing devices measure the human input force and directly command the equivalent amount of braking so as to simulate human control and thereby enabling a semi-autonomous driving mode (as the vehicle's computing devices may still control steering).

As another alternative, the equivalent amount of braking for the input force may be input into the autonomous vehicle's planning system in order to generate a trajectory for the vehicle to follow. In practice, when the input force exceeds a certain duration or force threshold, the autonomous vehicle's computing devices may trigger a higher-level fault response. Triggering a higher-level fault response may enable the vehicle's computing devices to consider the context of the vehicle before taking action and may not actually disengage the autonomous driving mode or immediately change the driving behavior.

In some instances, the equivalent amount of braking may be designated as a threshold minimum amount of braking for the trajectory. In this regard, the planning system will solve for a trajectory that includes at least the equivalent amount of braking but also possibly more. As such, the threshold minimum amount of braking may be treated as a hard constraint or requirement. In other instances, the minimum amount of braking may be given a priority or rather, may be treated as a soft constraint that can be adjusted in certain circumstances in order to prevent unsafe situations.

The features described herein may provide for autonomous vehicles with drive by wire braking systems to respond to a driver applying a force on a brake pedal in an appropriate and safe way.

Example Systems

Figure 1:
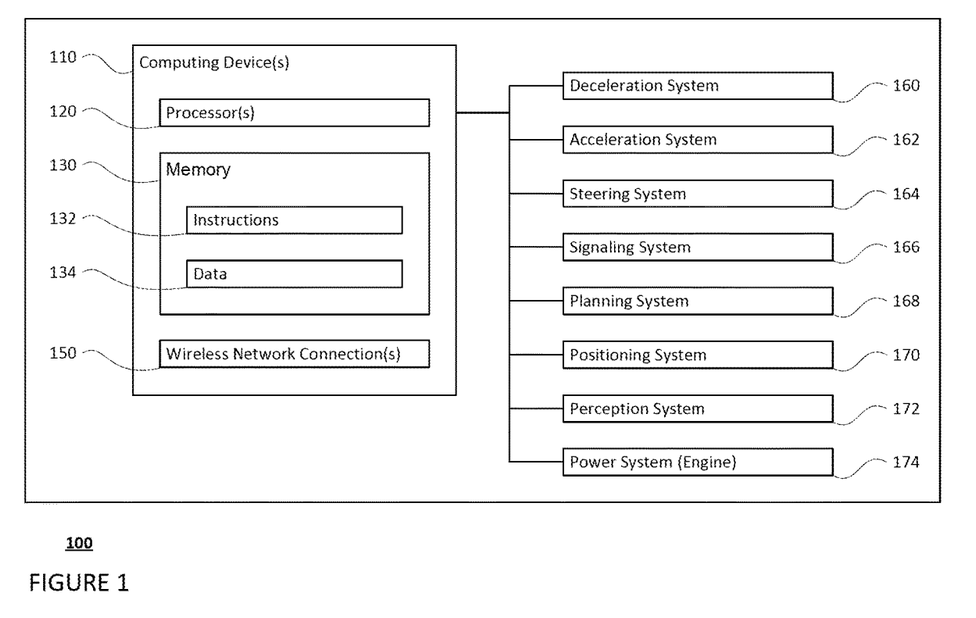
FIG. 1 is a functional diagram of an example vehicle in accordance with aspects of the disclosure.

A As shown in FIG. 1, a vehicle 100 in accordance with one aspect of the disclosure includes various components.

While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

The computing devices 110 may also be connected to one or more speakers as well as one or more user inputs. The speakers may enable the computing devices to provide audible messages and information, such as the alerts described herein, to occupants of the vehicle, including a driver. In some instances, the computing devices may be connected to one or more vibration devices configured to vibrate based on a signal from the computing devices in order to provide haptic feedback to the driver and/or any other occupants of the vehicle. As an example, a vibration device may consist of a vibration motor or one or more linear resonant actuators placed either below or behind one or more occupants of the vehicle, such as embedded into one or more seats of the vehicle.

The user input may include a button, touchscreen, or other devices that may enable an occupant of the vehicle, such as a driver, to provide input to the computing devices 110 as described herein. As an example, the button or an option on the touchscreen may be specifically designed to cause a transition from the autonomous driving mode to the manual driving mode or the semi-autonomous driving mode.

In one aspect the computing devices 110 may be part of an autonomous control system capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, routing system 166, planning system 168, positioning system 170, and perception system 172 in order to control the movement, speed, etc. of vehicle 100 in accordance with the instructions 132 of memory 130 in the autonomous driving mode. In this regard, each of these systems may de one or more processors, memory, data and instructions. Such processors, memories, instructions and data may be configured similarly to one or more processors 120, memory 130, instructions 132, and data 134 of computing device 110.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle.

Figure 2A:
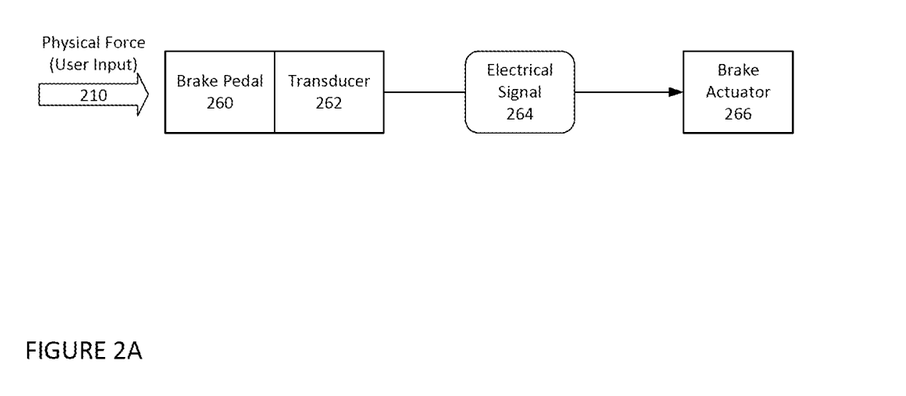
FIG. 2A is an example functional diagram of a drive by wire braking system in accordance with aspects of the disclosure.
Figure 2B:
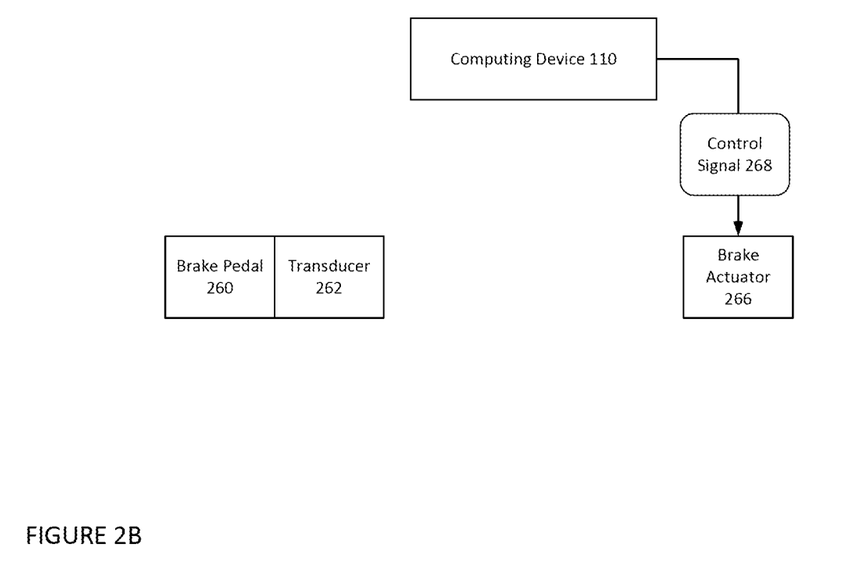
FIG. 2B is an example functional diagram of a drive by wire braking system in accordance with aspects of the disclosure.

The deceleration system 160 may include a drive by wire braking system which enables control of the brakes by electrical signals rather than by building up pressure and controlling brakes mechanically. For example, when operating in a manual driving mode or semi-autonomous driving mode (where a passenger controls braking) as shown in FIG. 2A, input force 210 to a brake pedal 260 is converted by a transducer 262 of the brake pedal to an electrical signal 264 which identifies a corresponding amount of braking power required to decelerate the vehicle. This electrical signal 264 is sent via a wired connection to the vehicle's electromechanical brake actuators 266 in order to control the vehicle's deceleration. In this regard, there is no direct, physical connection between the brake pedal and the vehicle's brakes other than the "wire" that carries the electrical signals to the actuators. In addition, turning to FIG. 2B, when operating the autonomous driving mode, control signals 268 (also electrical signals) from the computing devices 110 may be sent to the brake actuators 266 in order to control the deceleration of the vehicle in accordance with a trajectory generated by the planning system 168 without requiring input to the brake pedal.

Planning system 168 may be used by computing devices 110 in order to determine and follow a route generated by a routing system 166 to a location. For instance, the routing system 166 may use map information to determine a route from a current location of the vehicle to a drop off location. The planning system 168 may periodically generate trajectories, or short-term plans for controlling the vehicle for some period of time into the future, in order to follow the route (a current route of the vehicle) to the destination. In this regard, the planning system 168, routing system 166, and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In addition, the map information may identify area types such as constructions zones, school zones, residential areas, parking lots, etc.

The map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

While the map information may include an image-based map, the map information need not be entirely image based (for example, raster). For example, the map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map and/or on the earth. The positioning system 170 may also include a GPS receiver to determine the device's latitude, longitude and/or altitude position relative to the Earth. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The positioning system 170 may also include other devices in communication with the computing devices of the computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location.

Figure 3:
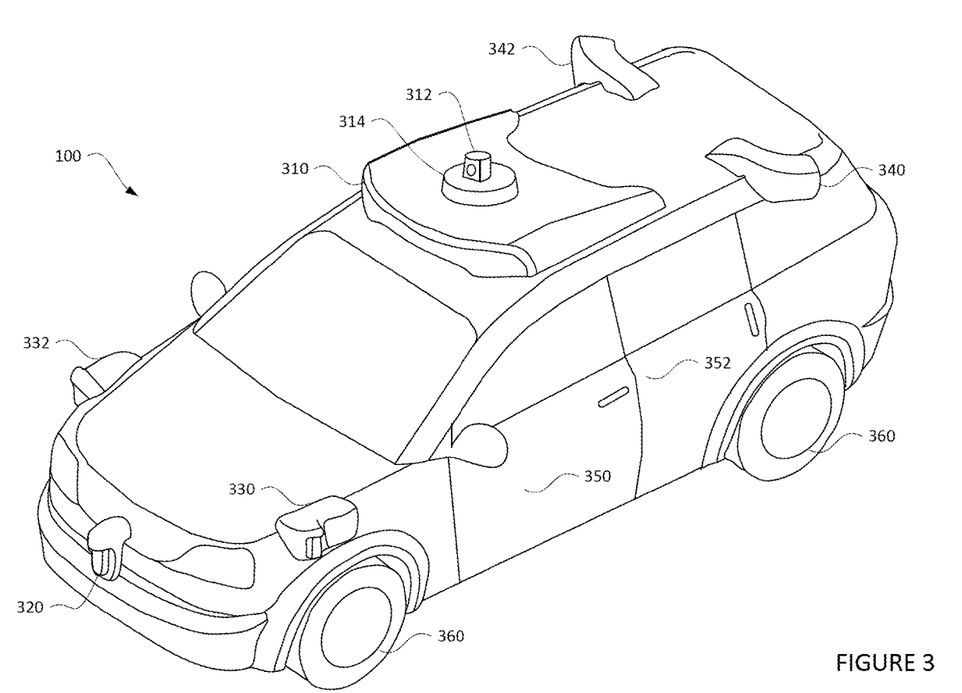
FIG. 3 is an example external view of a vehicle in accordance with aspects of the disclosure.

For instance, FIG. 3 is an example external view of vehicle 100. In this example, roof-top housing 310 and housings 312, 314 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 350. Vehicle 100 also includes housings 340, 342 for radar units and/or cameras also located on the roof of vehicle 100. Additional radar units and cameras may be located at the front and rear ends of vehicle 100 and/or on other positions along the roof or roof-top housing 310. In addition, Vehicle 100 also includes many features of a typical passenger vehicle such as doors 350, 352, wheels 360, 362, etc.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, routing system 166, planning system 168, positioning system 170, perception system 172, and power system 174 (i.e. the vehicle's engine or motor) in order to control the movement, speed, etc. of vehicle 100 in accordance with the instructions 132 of memory 130.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their features. These features may include location, type, heading, orientation, speed, acceleration, change in acceleration, size, shape, etc. In some instances, features may be input into a behavior prediction system software module which uses various behavior models based on object type to output a predicted future behavior for a detected object.

In other instances, the features may be put into one or more detection system software modules, such as a traffic light detection system software module configured to detect the states of known traffic signals, a school bus detection system software module configured to detect school busses, construction zone detection system software module configured to detect construction zones, a detection system software module configured to detect one or more persons (e.g. pedestrians) directing traffic, a traffic accident detection system software module configured to detect a traffic accident, an emergency vehicle detection system configured to detect emergency vehicles, etc. Each of these detection system software modules may input sensor data generated by the perception system 172 and/or one or more sensors (and in some instances, map information for an area around the vehicle) into various models which may output a likelihood of a certain traffic light state, a likelihood of an object being a school bus, an area of a construction zone, a likelihood of an object being a person directing traffic, an area of a traffic accident, a likelihood of an object being an emergency vehicle, etc., respectively.

Detected objects, predicted future behaviors, various likelihoods from detection system software modules, the map information identifying the vehicle's environment, position information from the positioning system 170 identifying the location and orientation of the vehicle, a destination for the vehicle as well as feedback from various other systems of the vehicle may be input into a planning system software module of the planning system 168. The planning system may use this input to generate trajectories for the vehicle to follow for some brief period of time into the future based on a current route of the vehicle generated by a routing module of the routing system 166. A control system software module of the computing devices 110 may be configured to control movement of the vehicle, for instance by controlling braking, acceleration and steering of the vehicle, in order to follow a trajectory.

Computing devices 110 may also include one or more wireless network connections 150 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 172 to detect and respond to objects when needed to reach the location safely. Again, in order to do so, computing device 110 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g. by using turn signals). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Example Methods

Figure 4:
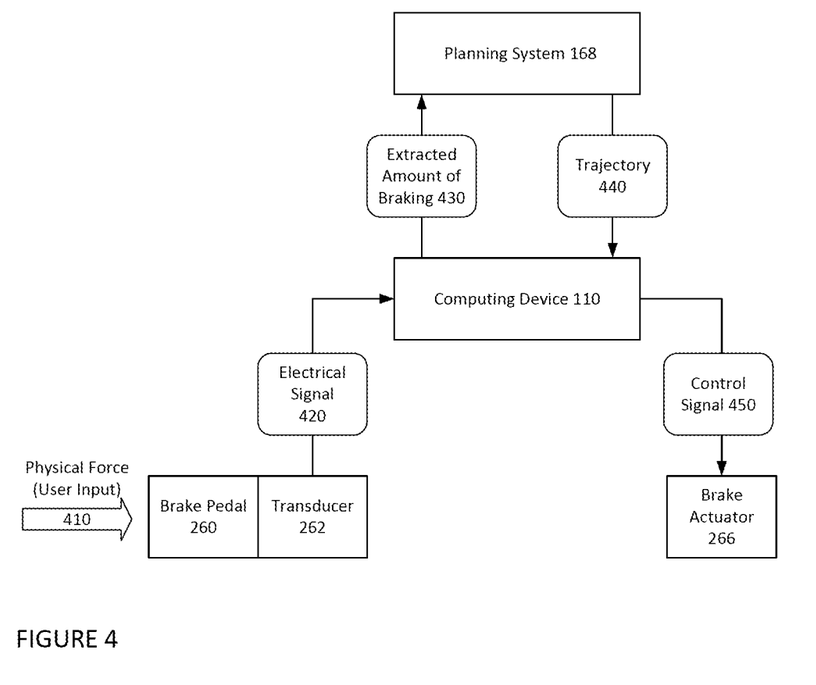
FIG. 4 is an example functional diagram of a drive by wire braking system in accordance with aspects of the disclosure.
Figure 9:
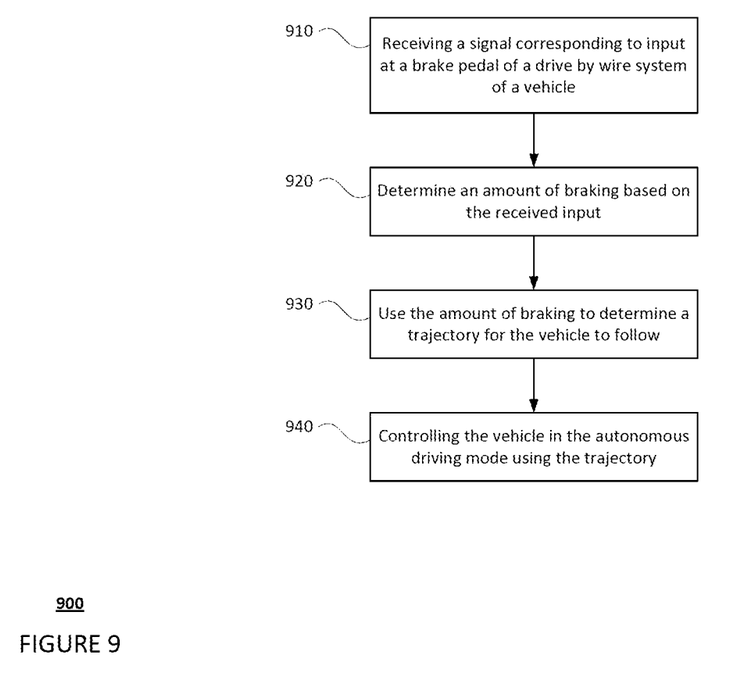
FIG. 9 is an example flow diagram in accordance with aspects of the disclosure.

FIG. 9 is an example flow diagram 900 for controlling a vehicle in an autonomous driving mode where the vehicle includes a drive by wire braking system in accordance with aspects of the disclosure. The blocks of flow diagram 900 may be performed by one or more processors of one or more computing devices, such as the processors 120 of computing devices 110. In this example, at block 910, while the vehicle is being controlled in the autonomous driving mode, a signal corresponding to input at a brake pedal of the drive by wire braking system is received. As depicted in FIG. 4, when the brake pedal 260 is depressed, the transducer 262 of the brake pedal may convert the input force 410 on the brake pedal into an electrical signal 420 which identifies either the amount of force and/or a corresponding amount of braking. This electrical signal may be sent to and received by the computing devices 110.

Turning to block 920, an amount of braking is determined based on the received input. For example, the computing devices 110 may extract an amount of braking from the electrical signal 420 or may simply convert the amount of force to a corresponding amount of braking. In other words, from the electrical signal 420, the computing devices 110 can determine the force the human is applying on the brake pedal and take any number of different responsive actions. For instance, the computing devices 110 may respond by disengaging the autonomous driving mode and switching to a manual driving mode. The computing devices measure the human input force and directly command the equivalent amount of braking by sending the electrical signal directly to the brake actuators 266 so as to simulate human control and thereby enabling a semi-autonomous driving mode (as the vehicle's computing devices may still control steering).

As another alternative, turning to block 930 of FIG. 9, the amount of braking is used to determine a trajectory for the vehicle to follow. In other words, as shown in FIG. 4, the extracted amount of braking 430 for the input force may be input into planning system 168 in order to generate a trajectory 440 for the vehicle 100 to follow. In practice, when the input force exceeds a certain duration or force threshold, the autonomous vehicle's computing devices may trigger a higher-level fault response which causes the computing devices 110 to input the extracted amount of braking into the planning system 168. In this regard, triggering a higher-level fault response may enable the vehicle to consider the context in which the vehicle is driving before taking action and may not actually disengage the autonomous driving mode or immediately change the driving behavior. In other words, in addition to detected objects, predicted future behaviors, various likelihoods from detection system software modules, the map information identifying the vehicle's environment, position information from the positioning system 170 identifying the location and orientation of the vehicle, a destination and route for the vehicle as well as feedback from various other systems of the vehicle, the extracted amount of braking is also input into planning system 168 in order to determine a trajectory for the vehicle to follow.

In some instances, the computing devices 110 may also ignore all input forces at the brake pedal 260) that are below a certain duration threshold and/or force threshold to ensure that accidental input to the brake pedal does not cause sudden deceleration. In this regard, before inputting an extracted amount of braking into the planning system 168, the computing devices may first compare the duration and/or force of the input to a threshold value. Thus, extended input to the brake pedal or hard input to the brake pedal could trigger the vehicle's computing device to respond, whereas a very short or light input, which may be more likely to be caused by an accidental input, could be ignored. Such thresholds could be hand tuned.

Returning to FIG. 4, the extracted amount of braking 430 may be used by the planning system 168 to generate a trajectory 440 in various ways. For instance, the equivalent amount of braking may be designated as a threshold minimum amount of braking for the trajectory. In this regard, the planning system 168 will attempt to solve for a trajectory that includes at least the equivalent amount of braking but also possibly more. In this regard, the threshold minimum amount of braking may be treated as a hard constraint or requirement. In other words, the force input is effectively treated like a request for the vehicle to stop and/or pull over immediately such that the vehicle's computing devices will force the vehicle to a stop at a certain rate corresponding to the threshold minimum amount of braking or faster.

Figure 5:
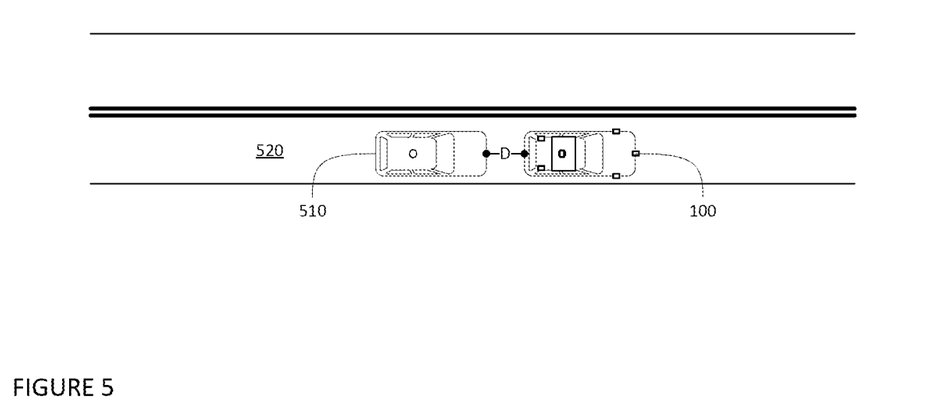
FIG. 5 is an example driving scenario in accordance with aspects of the disclosure.

In other instances, the minimum amount of braking may be given a priority and therefore be treated as one of a number of soft constraints that can be adjusted and/or disregarded as needed. In this regard, higher priority constraints are closer to hard constraints than lower priority constraints which can more readily be ignored. As such, the actual deceleration could therefore change from the minimum amount of braking in certain scenarios or driving circumstances in order to prevent unsafe situations. As one example, if there is a tailgater or another vehicle within some distance behind the autonomous vehicle and driving a certain speed when the input force 410 is received at the brake pedal 260, the planning system 168 could ignore or reduce the priority of the constraint for the minimum amount of braking in order to allow the vehicle to decelerate more slowly. This may reduce the likelihood of the autonomous vehicle being rear-ended by the tailgater to limit the chance of a rear ending. For example, turning to FIG. 5, vehicle 100 is driving along a roadway 520, and a vehicle 510 is following behind vehicle 100 in the same lane. The sensors of the perception system 172 may detect and identify vehicle 510 as well as its characteristics including, location, orientation, heading, speed, etc. This information may be input into the planning system 168 and used by the planning system to determine that the distance D (between vehicle 510 and vehicle 100) as well as the speed of vehicle 510 relative to the speed of vehicle 100 is such that the planning system should adjust the constraint to ignore or reduce the minimum amount of braking as needed to avoid being rear-ended by the vehicle 510 or alternatively could put a higher priority on the constraint to avoid being rear-ended than the constraint for the minimum amount of braking.

Figure 6:
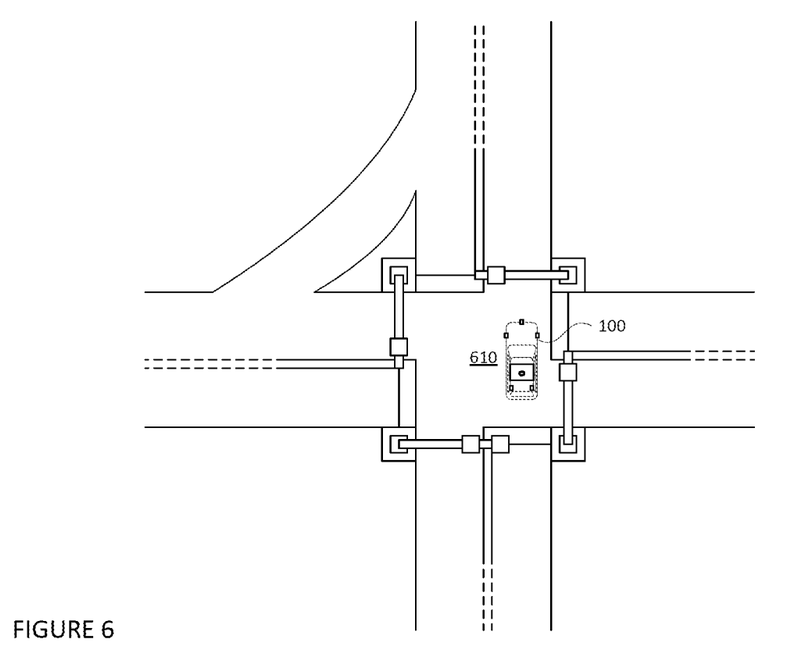
FIG. 6 is an example driving scenario in accordance with aspects of the disclosure.
Figure 7:
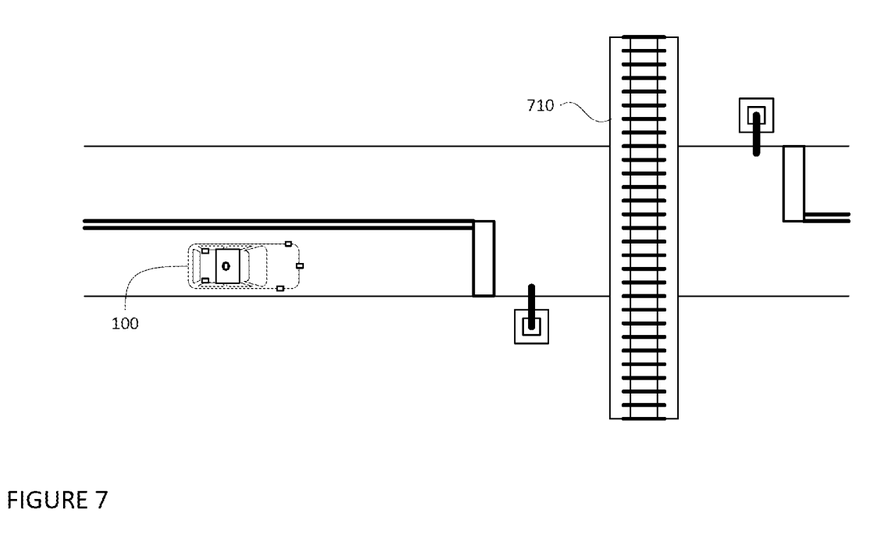
FIG. 7 is an example driving scenario in accordance with aspects of the disclosure.

As another example, if the autonomous vehicle is crossing an intersection or approaching railroad crossing when the input force 410 is received at the brake pedal 260, the planning system 168 could ignore or reduce the minimum amount of braking in order to prevent the autonomous vehicle from stopping until it is safe to do so (e.g. beyond the intersection or railroad crossing). For example, turning to FIG. 6, vehicle 100 is crossing through an intersection 610, and in FIG. 7, vehicle 100 is approaching a railroad crossing 710. As noted above, this information may be included in the map information and/or detected by the sensors of the perception system, and input into the planning system 168 in order to determine trajectories. Thus, the combination of the map information and/or real time detections of intersections and railroad crossing as well as the location of the vehicle from the positioning system 170 may be used by the planning system 168 to determine the vehicle's location relative to features such as intersections and railroad crossings. These relative position determinations may be used to adjust the constraint to ignore or reduce the minimum amount of braking to avoid stopping in an intersection or railroad crossing or alternatively could put a higher priority on the constraint to avoid stopping in an intersection or railroad crossing than the constraint for the minimum amount of braking.

Figure 8:
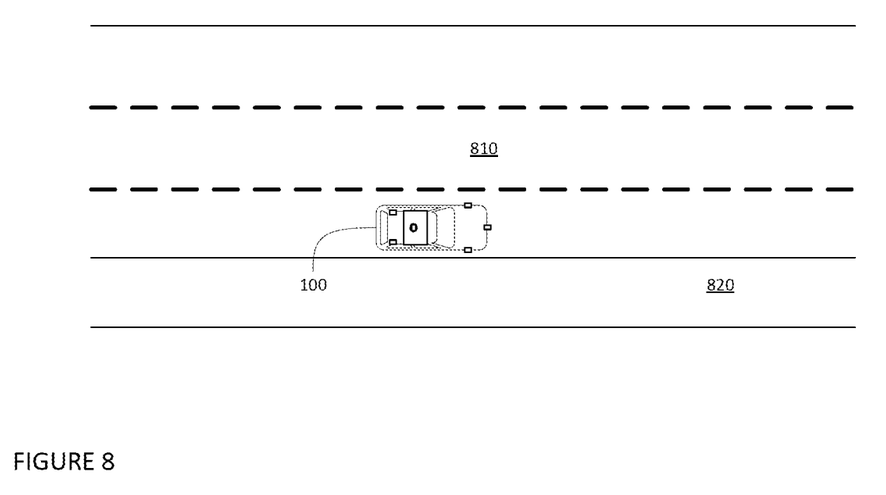
FIG. 8 is an example driving scenario in accordance with aspects of the disclosure.

As another example, if the vehicle is driving on a highway or other high-speed road when the input force 410 is received at the brake pedal 260, the planning system could ignore the minimum amount of braking in order to prevent the vehicle 100 from stopping until it is safe to do so (e.g. until the vehicle has changed lanes or has moved onto a shoulder). In such situations, if the electrical signal 420 were to be directly forwarded to the brake actuator 266 (as opposed to being input into the planning system 168), a sufficiently strong person could cause the vehicle to stop in lane since the planning system 168 might not have time to safely pull the vehicle over. For example, turning to FIG. 8, vehicle 100 is driving on a highway 810. As noted above, this information may be included in the map information and input into the planning system 168 in order to determine trajectories. Thus, the combination of the map information and the location of the vehicle from the positioning system 170 may be used by the planning system 168 to determine that the vehicle is driving on a highway. As such, the minimum amount of braking may be treated as a soft constraint by the planning system 168 such that the planning system could initially completely ignore the input until the vehicle has changed lanes and/or is beginning to decelerate on the shoulder 820.

Returning FIG. 9, at block 940, the vehicle is controlled in the autonomous driving mode using the trajectory. In other words, the computing devices 110 may receive the trajectory 440 from the planning system 168 and generate various control signals, including control signal 450. These control signals may be sent to the brake actuator 266 of the deceleration system 160 (and acceleration system 162 though not shown) in order to control the speed of the vehicle as well as to the steering system 164 in order to control the direction of vehicle 100. In this regard, the control signal 450 sent to brake actuator 266 may identify an amount of braking which may be the same or different from the extracted amount of braking for the input force.

The features described herein may provide for autonomous vehicles with drive by wire braking systems to respond to a driver applying a force on a brake pedal in an appropriate and safe way.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples: rather, the examples are intended to illustrate only one of many possible embodiments. Further, the same reference numbers in different drawings can identify the same or similar elements.

The invention claimed is:

1. A method of controlling a first vehicle in an autonomous driving mode, the method comprising:
    while the first vehicle is being controlled in the autonomous driving mode, receiving, by one or more processors, a signal corresponding to input at a brake pedal of the first vehicle;
    receiving, by the one or more processors, a trajectory for the first vehicle to follow, the trajectory having a constraint associated with a threshold minimum amount of braking; and
    controlling, by the one or more processors, the first vehicle in the autonomous driving mode based on the signal and a priority of the constraint, wherein the priority of the constraint can be adjusted in order to prevent unsafe situations associated with the first vehicle and a second vehicle in an environment of the first vehicle.

2. The method of claim 1, wherein the priority of the constraint is adjusted to reduce or ignore the threshold minimum amount of braking.

3. The method of claim 2, wherein the adjustment of the priority of the constraint causes deceleration of the first vehicle to change from the threshold minimum amount of braking.

4. The method of claim 3, wherein the deceleration of the first vehicle is reduced when the second vehicle is driving at a particular speed within a predetermined distance behind the first vehicle.

5. The method of claim 4, further comprising:
    detecting and identifying the second vehicle and characteristics of the second vehicle.

6. The method of claim 5, wherein the characteristics include at least one of location, orientation, heading or speed.

7. The method of claim 6, further comprising:
    determining, by the one or more processors, a distance between the first vehicle and the second vehicle.

8. The method of claim 1, further comprising:
    determining, by the one or more processors, a speed of the second vehicle relative to a speed of the first vehicle.

9. The method of claim 1, further comprising:
    determining, by the one or more processors, a location of the first vehicle; and
    adjusting, by the one or more processors based on the location of the first vehicle, the priority of the constraint to reduce or ignore the threshold minimum amount of braking.

10. The method of claim 9, wherein the location corresponds to an intersection.

11. The method of claim 9, wherein the location corresponds to a railroad crossing.

12. A first vehicle comprising:
    a brake pedal; and
    one or more processors configured to:
        while the first vehicle is being controlled in an autonomous driving mode, receive a signal corresponding to input at the brake pedal;
        receive a trajectory for the first vehicle to follow, the trajectory having a constraint associated with a threshold minimum amount of braking; and
        control the first vehicle in the autonomous driving mode based on the signal and a priority of the constraint, wherein the priority of the constraint can be adjusted in order to prevent unsafe situations associated with the first vehicle and a second vehicle in an environment of the first vehicle.

13. The first vehicle of claim 12, wherein the priority of the constraint is adjusted to reduce or ignore the threshold minimum amount of braking.

14. The first vehicle of claim 13, wherein the adjustment of the priority of the constraint causes deceleration of the first vehicle to change from the threshold minimum amount of braking.

15. The first vehicle of claim 14, wherein the deceleration of the first vehicle is reduced when the second vehicle is driving at a particular speed within a predetermined distance behind the first vehicle.

16. The first vehicle of claim 15, wherein the one or more processors are further configured to determine a distance between the first vehicle and the second vehicle.

17. The first vehicle of claim 12, wherein the one or more processors are further configured to determine a speed of the second vehicle relative to a speed of the first vehicle.

18. The first vehicle of claim 12, wherein the one or more processors are further configured to:
   determine a location of the first vehicle; and
   adjust, based on the location of the first vehicle, the priority of the constraint to reduce or ignore the threshold minimum amount of braking.

19. The first vehicle of claim 18, wherein the location corresponds to an intersection.

20. The first vehicle of claim 18, wherein the location corresponds to a railroad crossing.

* * * * *